(12) United States Patent
Crotteau et al.

(10) Patent No.: US 12,224,561 B1
(45) Date of Patent: Feb. 11, 2025

(54) COMPARTMENTALIZED PANEL

(71) Applicants: Dean M Crotteau, Sawyer, MN (US); Paul R Crotteau, Carlton, MN (US)

(72) Inventors: Dean M Crotteau, Sawyer, MN (US); Paul R Crotteau, Carlton, MN (US)

( * ) Notice: Subject to any disclaimer, the term of this patent is extended or adjusted under 35 U.S.C. 154(b) by 201 days.

(21) Appl. No.: 18/120,203

(22) Filed: Mar. 10, 2023

Related U.S. Application Data

(60) Provisional application No. 63/391,923, filed on Jul. 25, 2022, provisional application No. 63/319,026, filed on Mar. 11, 2022.

(51) Int. Cl.
*H02B 1/30* (2006.01)
*H02B 1/06* (2006.01)
*H02B 11/127* (2006.01)

(52) U.S. Cl.
CPC .............. *H02B 1/301* (2013.01); *H02B 1/066* (2013.01); *H02B 11/127* (2013.01)

(58) Field of Classification Search
None
See application file for complete search history.

(56) References Cited

U.S. PATENT DOCUMENTS

| | | | | |
|---|---|---|---|---|
| 4,251,851 A | * | 2/1981 | Diersing | H02B 1/056 361/652 |
| 4,631,634 A | * | 12/1986 | Raabe | H02B 1/42 361/647 |
| 5,001,602 A | * | 3/1991 | Suffi | H04Q 1/026 361/829 |
| 6,565,166 B1 | * | 5/2003 | Bulk | A47B 47/04 312/257.1 |
| 9,609,947 B1 | * | 4/2017 | Tassin | A47B 81/00 |
| 2009/0185332 A1 | * | 7/2009 | Coomer | H02B 13/025 361/605 |
| 2011/0176258 A1 | * | 7/2011 | Creighton | H02B 1/056 361/642 |
| 2021/0242667 A1 | * | 8/2021 | Harr | H02B 1/202 |

* cited by examiner

*Primary Examiner* — Krystal Robinson
(74) *Attorney, Agent, or Firm* — Johnson and Phung; Thomas N. Phung

(57) ABSTRACT

A compartmentalized panelboard that includes a first panel interior having an incoming power and a main breaker mechanism, a second panel interior having a power distribution bus with the main breaker mechanism electrically connected to the power distribution bus of the second panel interior and controlling the feed of power between the panel interiors, a conductive material connecting the main breaker mechanism to the power distribution bus of the second panel interior, at least one door enclosing the panel interiors, a nonconductive physical barrier separating the panel interiors, a sealing device allowing the conductive material to pass from the first panel interior through the nonconductive physical barrier into the second panel interior with the nonconductive physical barrier and the dead front panels physically and electrically isolating the power distribution bus of the second panel interior from the incoming power of the first panel interior when power is cut off by the main breaker mechanism.

19 Claims, 8 Drawing Sheets

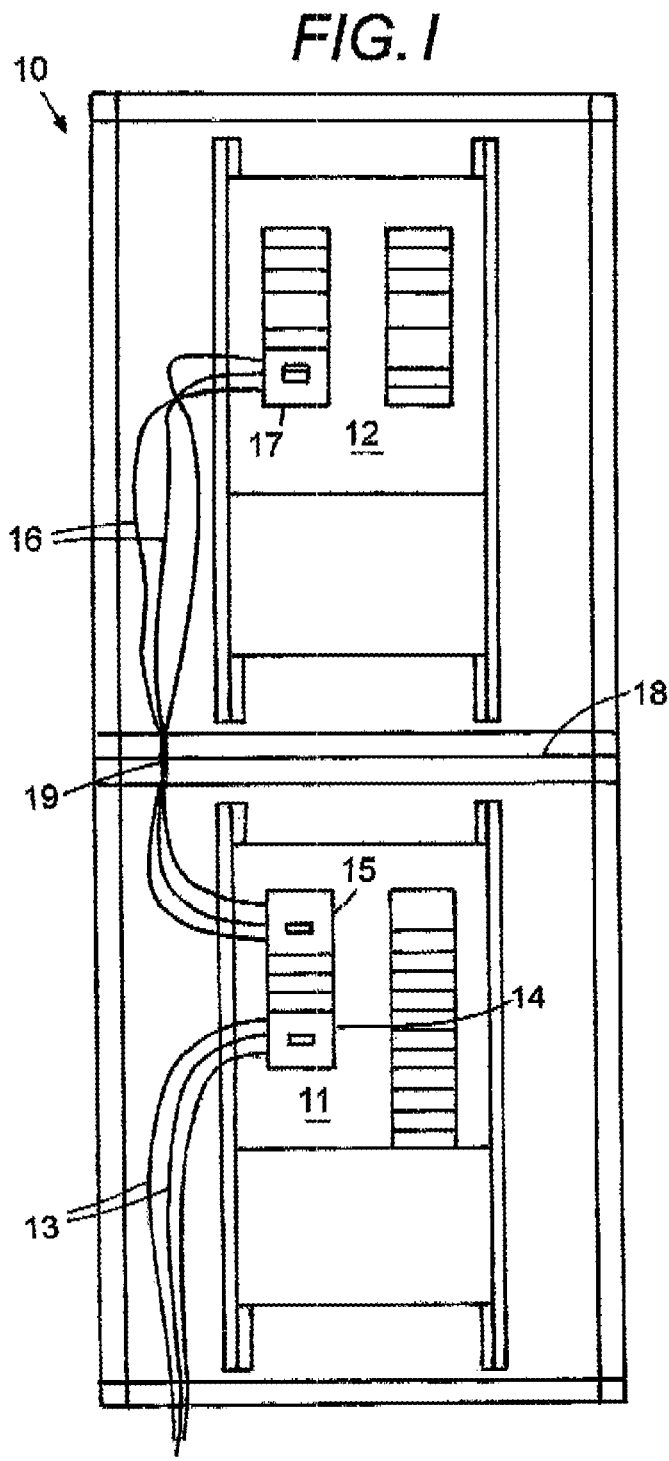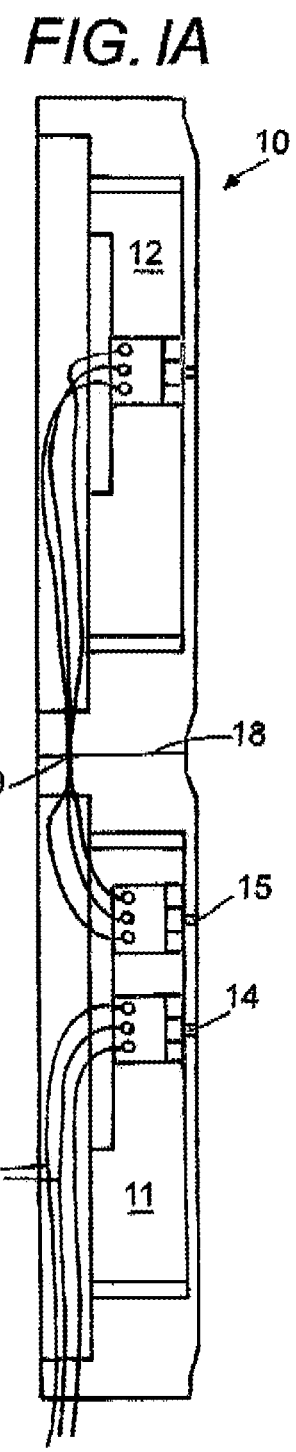

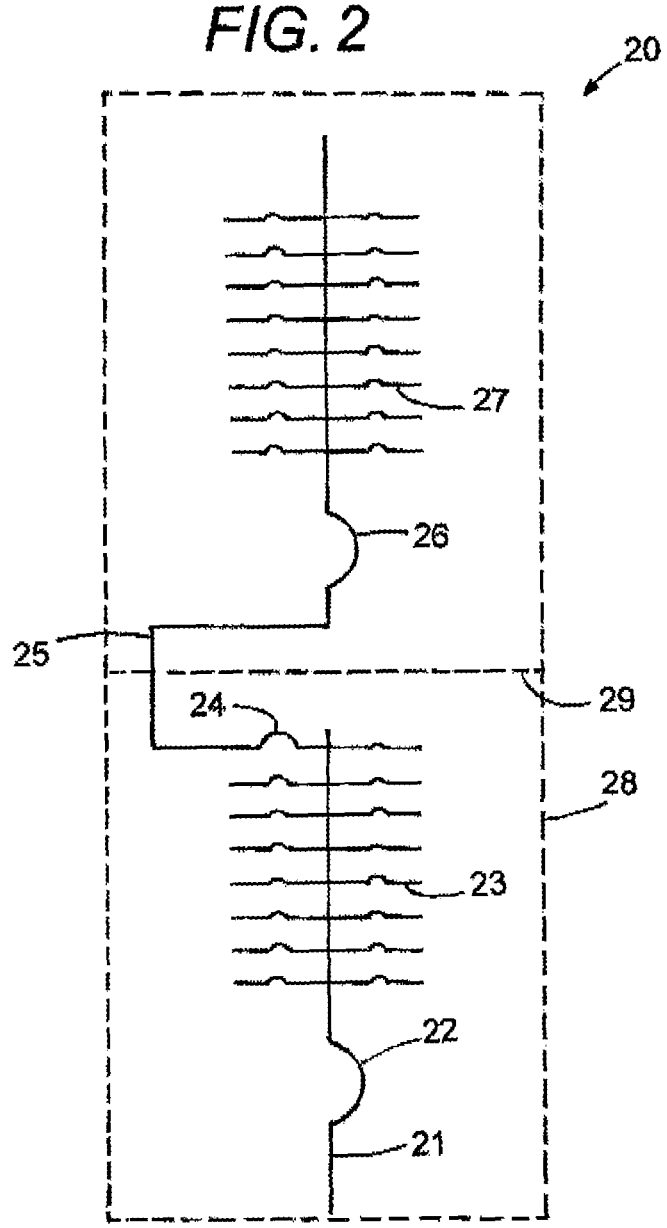

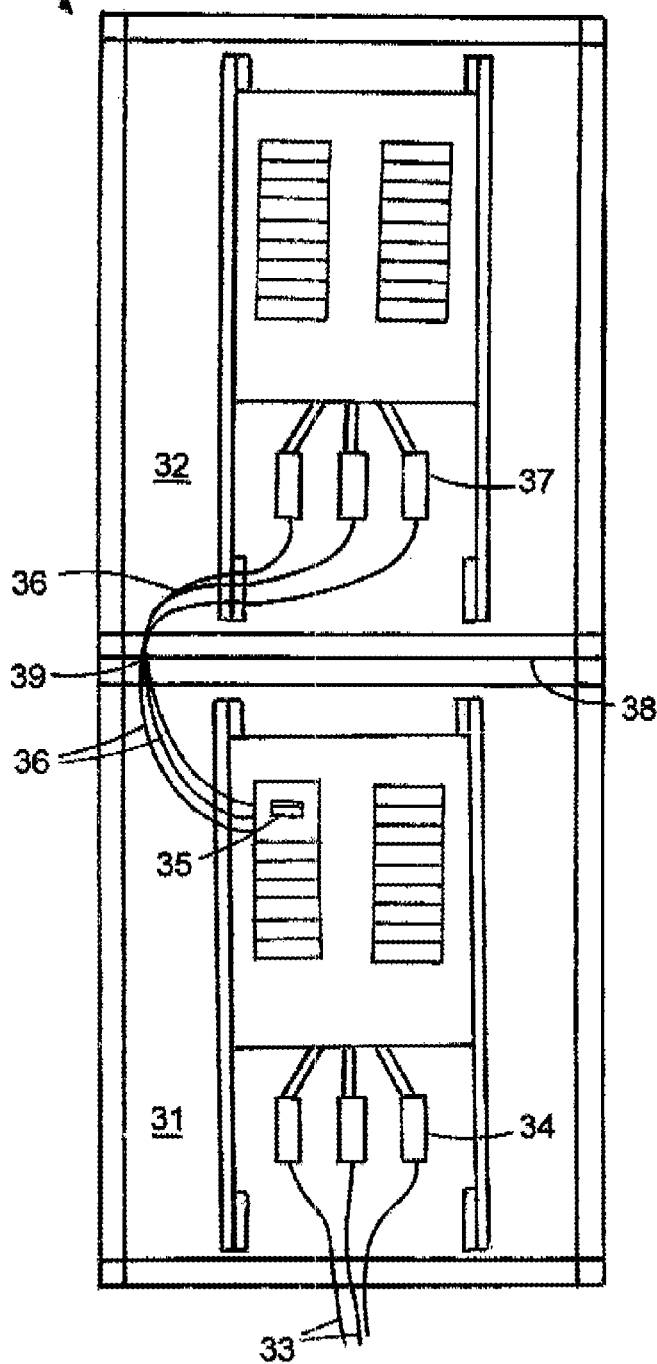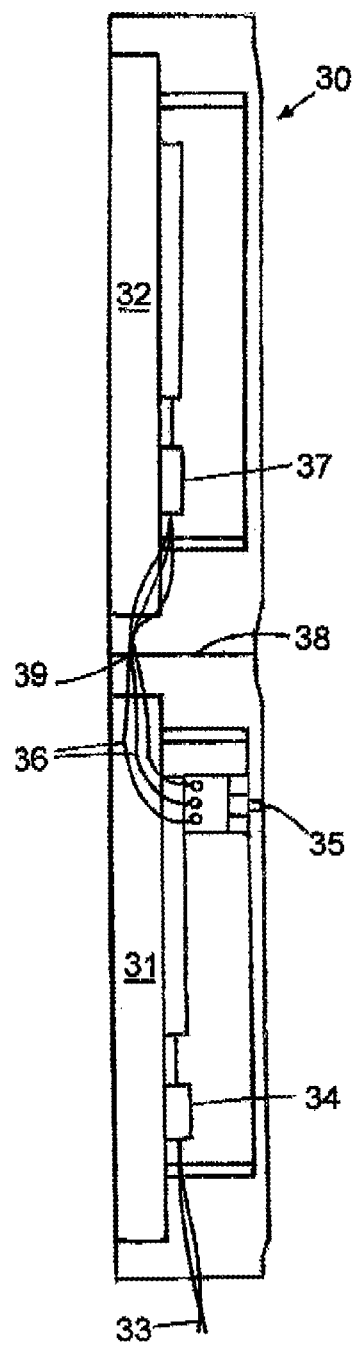

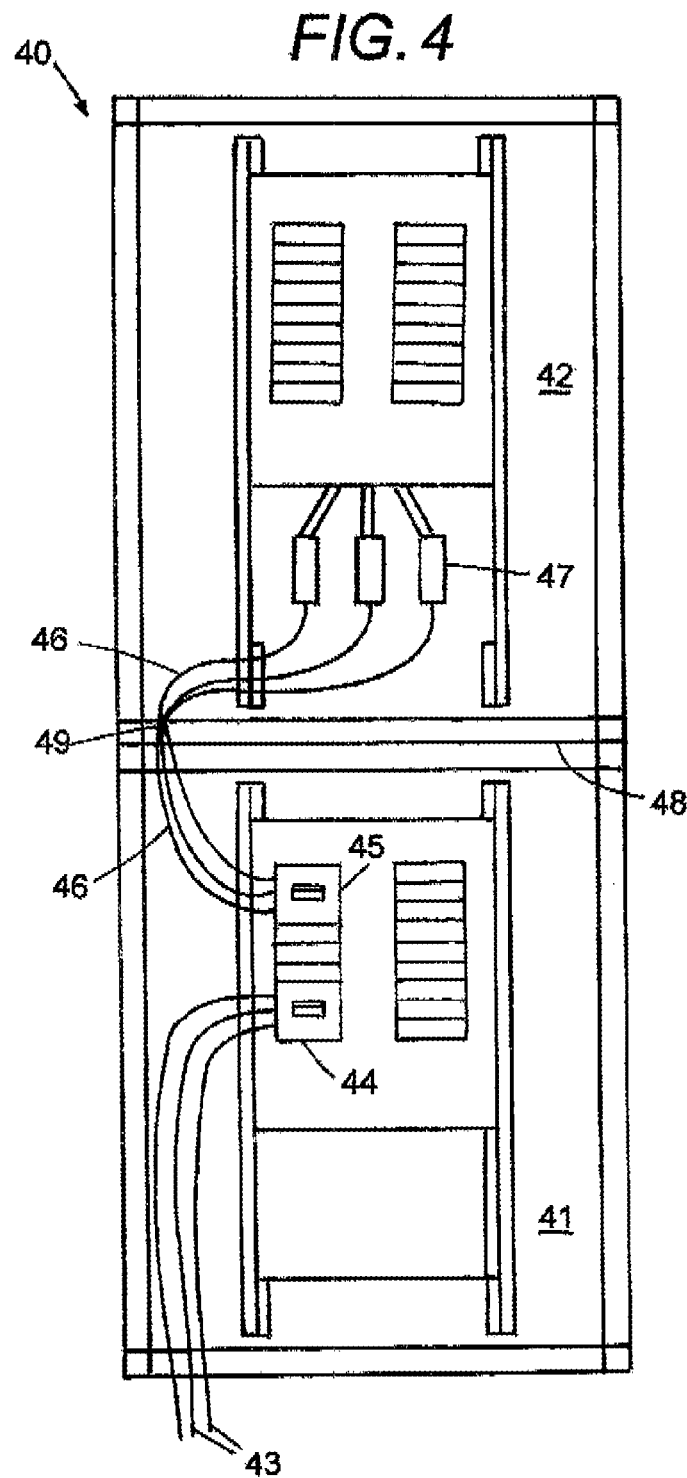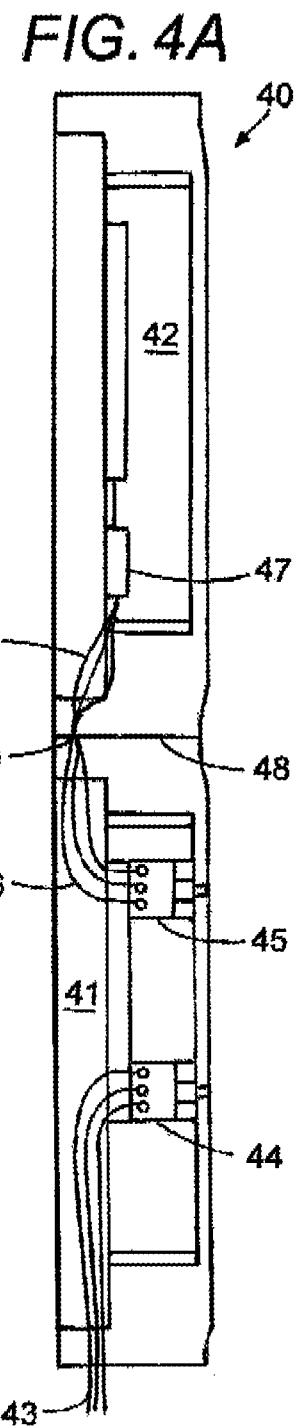

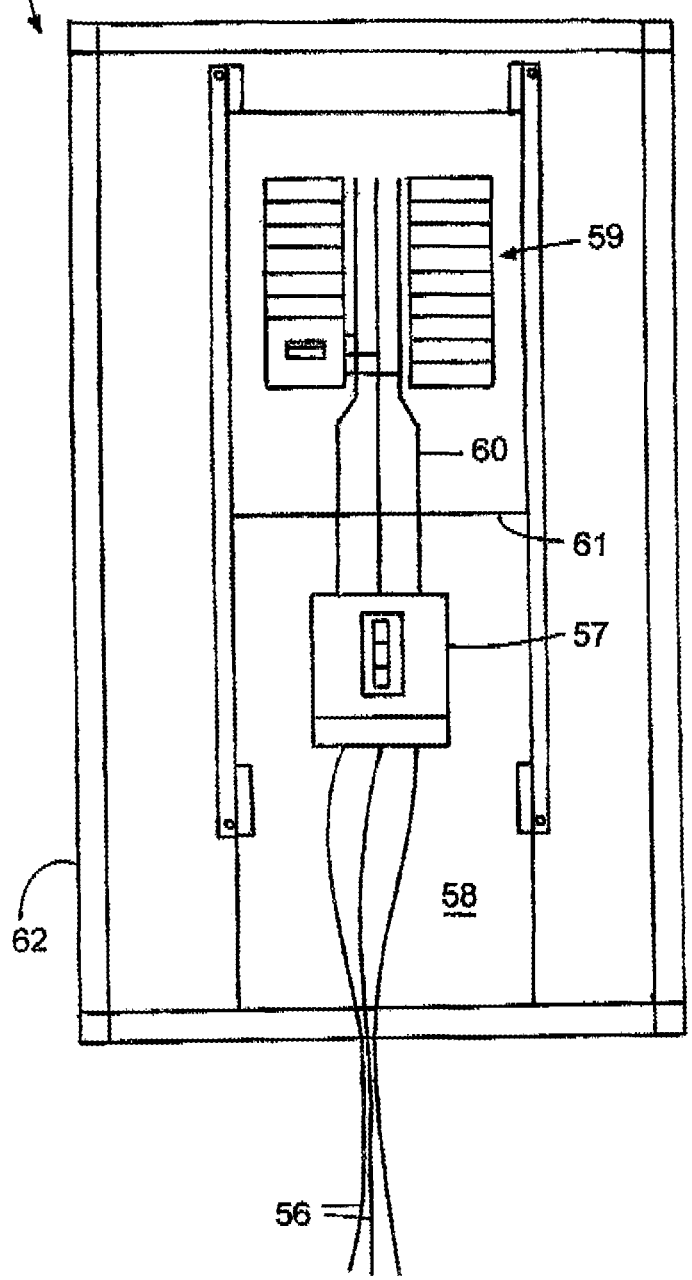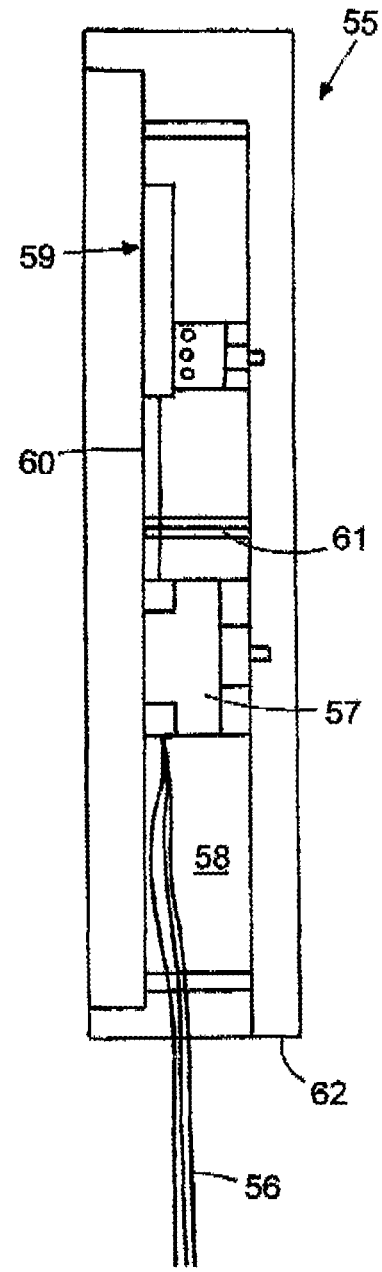

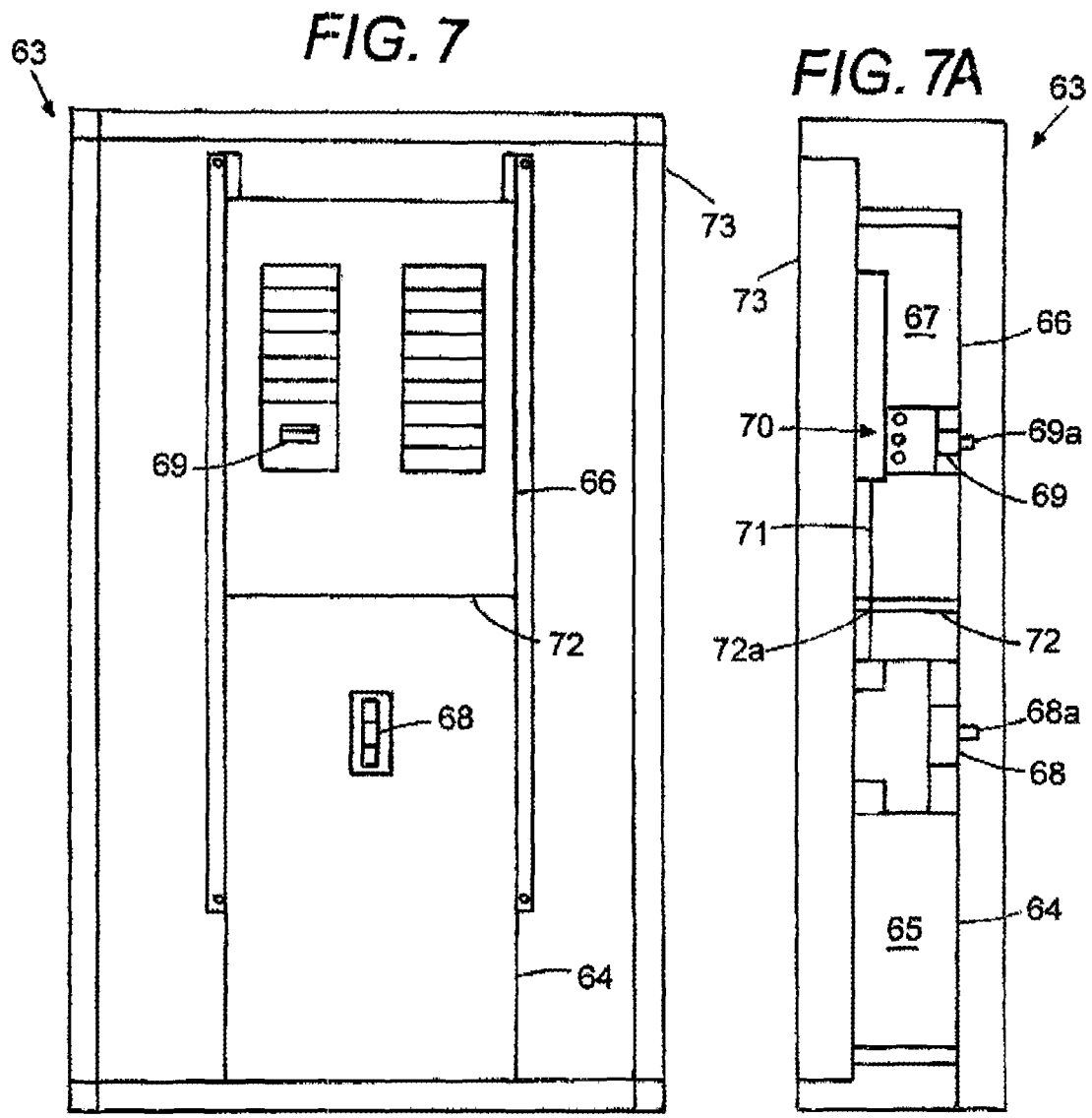

COMPARTMENTALIZED PANEL

FIELD OF THE INVENTION

This invention relates generally to industrial, commercial, and residential electrical panelboards, and more specifically to a fully compartmentalized panelboard that both physically and electrically isolates two individual interiors that supports power distribution bus therein from each other to eliminate the hazard of accidental user exposure to any energized components while also avoiding the need to shut down all critical equipment of a building or upstream electrical equipment while performing electrical work, further reducing exposure to hazards.

CROSS-REFERENCE TO RELATED APPLICATIONS

This application claims priority to currently pending U.S. Provisional Application Ser. No. 63/319,026; filed on Mar. 11, 2022; titled COMPARTMENTALIZED PANEL and currently pending U.S. Provisional Application Ser. No. 63/391,923; filed on Jul. 25, 2022; titled COMPARTMENTALIZED MAIN BREAKER PANEL.

STATEMENT REGARDING FEDERALLY SPONSORED RESEARCH OR DEVELOPMENT

None

REFERENCE TO A MICROFICHE APPENDIX

None

BACKGROUND OF THE INVENTION

Human interaction with live electrical work such as during installation, servicing, modification, and maintenance of electrical components poses major electrocution and arc flash hazards.

There is a clear industry trend moving toward the prohibition of live electrical work. Several contractors and many end-user facilities are newly prohibiting live electrical work, and this movement is only growing.

These contractors and end users are not able to perform any maintenance, including changing or adding a circuit breaker to a panelboard, without de-energizing the entire panelboard.

However, completely shutting down power to a facility usually results in associated costs, and security issues and can expose other hazards, which often outweighs the need to completely shut down power to a facility in order to add a simple circuit to an existing panelboard in a facility. There thus exists a need for a solution that enables electrical power distribution systems to be safely worked on without compromising power supply continuity.

In addition, contractors and end users may also be exposed to arc flash hazards even when working in a panel in which the main breaker has been shut off. There may still be live components in the main breaker mechanism that users can be exposed to, even if accidentally. In most residential and small commercial scenarios, there is no option to turn the power off upstream without contacting the utility company for a full shutdown of the electrical service. There exists a need for a solution to protect end users and homeowners from accidental exposure to energize main breaker mechanisms and components.

SUMMARY OF THE INVENTION

Briefly, the present invention comprises a fully compartmentalized panelboard for physically and electrically isolating two individual interiors each supporting power distribution buses from the other. A first panel interior of the compartmentalized panelboard contains a power distribution bus therein with an isolating device such as a circuit breaker or other type of switching device that feeds power from the first interior to a second interior of the compartmentalized panelboard containing a second power distribution bus therein, thereby allowing the first interior housing's content to stay energized while the second interior housing's contents are de-energized by opening the isolating device. The compartmentalized panelboard includes a grounded or nonconductive physical barrier separating the two panel interiors with each of the panel interiors having its own door or cover with the barrier between the two panel interiors and its separate doors functioning to provide full protection and isolation from energized components to effectively eliminate the hazard of accidental exposure to any energized components.

The present invention also comprises a fully compartmentalized main breaker panelboard that physically and electrically isolates the main breaker from the power distribution bus therein from each other. A first panel interior of the compartmentalized main breaker panelboard contains incoming power and a main breaker mechanism. Wiring is run through a non-conductive or grounded physical barrier to the power distribution bus contained in the second panel interior. The first panel interior containing the incoming power and the main breaker mechanism therein feeds power from the first compartment to a second compartment containing a power distribution bus therein with a barrier between that physically and electrically isolating the main breaker compartment from the power distribution compartment, thereby allowing the power distribution compartment to be completely free of live electrical components while maintenance is being performed.

The compartmentalized main breaker panelboard includes a grounded or nonconductive physical barrier separating the two compartments with each compartment having a separate dead front behind the panel door with the barrier and separate dead fronts providing full protection and isolation from energized components in the main breaker compartment to effectively eliminate the hazard of accidental exposure to any energized components.

BRIEF DESCRIPTION OF THE DRAWINGS

FIG. 1 is a front view showing a compartmentalized panelboard having a first main breaker interior and a second main breaker interior;

FIG. 1A is a side view showing the compartmentalized panelboard of FIG. 1;

FIG. 2 is a schematic diagram showing a power distribution through the first and second main breaker interiors of FIG. 1;

FIG. 3 is a front view showing a first main lug interior connected to a second main lug interior with cablings;

FIG. 3A is a side view showing the first and second main lug interiors of FIG. 3;

FIG. 4 is a front view showing a first main breaker interior connected to a second main lug interior with cablings;

FIG. 4A is a side view showing the main breaker interiors of FIG. 4A;

FIG. 6 is a front view showing an embodiment of a compartmentalized panelboard of the present invention illustrating a main breaker compartment connected to a second isolated interior;

FIG. 6A is a side view of the compartmentalized panelboard assembly of FIG. 6;

FIG. 7 is a front view of an alternative embodiment of a compartmentalized panelboard assembly of the present invention referenced in FIG. 6 showing a dead front for both isolated compartments;

FIG. 7A is a side view of the compartmentalized panelboard assembly of FIG. 7;

DESCRIPTION OF THE PREFERRED EMBODIMENT

Figure 5:
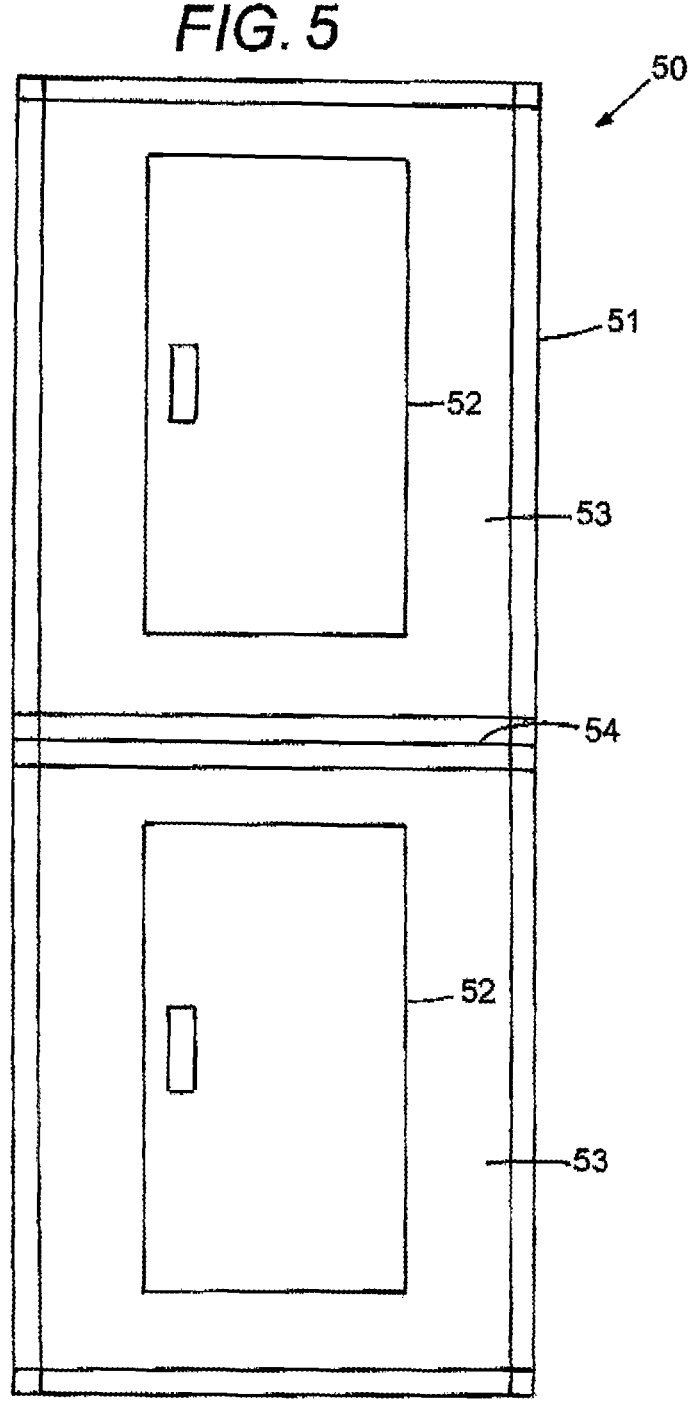
FIG. 5 is a front view of a compartmentalized panel with doors and a dead front installed.

The general purpose of the present invention, which will be described subsequently in greater detail, is to provide a fully compartmentalized panelboard that both physically and electrically isolates two individual interiors that support power distribution bus therein from each other to eliminate the hazard of accidental user exposure to any energized components while also avoiding the need to shut down all critical equipment of a building while performing electrical work.

The general purpose of the present invention is also directed to provide a fully compartmentalized, isolated main breaker that physically and electrically isolates the main breaker mechanism and components from the power distribution bus therein from each other to eliminate the hazard of accidental user exposure to any energized components while also avoiding the need to shut down upstream power sources or call the utility company in many cases.

There have thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

One embodiment of the present invention generally comprises a fully compartmentalized panelboard for physically and electrically isolating two individual interiors each supporting power distribution buses from each other. A first panel interior of the compartmentalized panelboard contains a power distribution bus therein with an isolating device such as a circuit breaker or other type of switching device that feeds power from the first interior to a second interior of the compartmentalized panelboard containing a second power distribution bus therein, thereby allowing the first interior housing's content to stay energized while the second interior housing's contents are de-energized by opening the isolating device.

The compartmentalized panelboard includes a grounded or non-conductive physical barrier separating the two panel interiors with each of the panel interiors having its own door or cover.

The barrier between the two panel interiors and its separate doors functions to provide full protection and isolation from energized components to effectively eliminate the hazard of accidental exposure to any energized components thereby mitigating a major safety concern in the field and solving several trade issues as contractors, electricians, and end users no longer have to choose between doing live work and shutting down critical equipment. With the design of the present invention, live work is avoided, and all critical equipment remains online.

With the present design, the power distribution bus of one of the panel interiors is physically and electrically isolated from the power distribution bus of the adjacent interior via a circuit breaker, or other disconnecting means that can be locked open.

Incoming power into the first interior housing may be fed either through main lugs or a main circuit breaker and may be service entrance rated when required by code. One interior will include the isolating device feeding the adjacent interior.

The second interior housing may also include main lugs or main breaker but is fed from an isolating device located in the first interior housing. Each interior housing and its corresponding power distribution bus may contain a number of different quantities and sizes of breakers or breaker spaces, preferably ranging from 10-1200 amps, single pole, two poles, or three poles phasing and containing any number of breakers or breakers spaces such as ranging between but not limited to 2 to 84 spaces per each interior. The power distribution bus in each interior housing may also range in amperage from 30 Amps to 1200 Amps.

Although the example of the present invention discussed below will be directed to the compartmentalized panelboard having two interior housings with one supporting a first set of circuits that supports critical loads in a building and the second supporting a second set of circuits that supports non-critical loads in the building, alternative embodiments of the present invention may comprise a compartmentalized panelboard having a plurality of interior housings each supporting a set of circuits with at least one of the interior housings supporting a set of circuits which supports critical loads in a building with a grounded or non-conductive physical barrier and a cover or door associated with each individual interior housing resulting in both physical and electrical isolation of the interior housings and the contents supported therein.

This above compartmentalized panelboard allows the end user to group critical loads which are desired or required to be online 100% of the time into the first interior housing, and place noncritical loads which can be shut down periodically or when required, such as general-purpose receptacles, into the second interior housing.

The barrier, separate doors, and isolating device in the above-compartmentalized panelboard then allow the first interior hosing and its critical loads to stay on or energized, while the second interior housing may be de-energized and worked on in the absence of voltage. The aforementioned eliminates both end-user downtime and the potential for shock or electrocution or arc flash hazards.

A second embodiment of the present invention generally comprises a fully isolated and compartmentalized main circuit breaker mechanism that physically and electrically isolates the main breaker from the power distribution bus therein from each other. A first panel interior of a compartmentalized main breaker panelboard contains an incoming power and a main breaker mechanism. Wiring is run through a non-conductive or grounded physical barrier to the power distribution bus contained in the second panel interior. The first panel interior containing the incoming power and the main breaker mechanism therein feeds power from the first compartment to a second compartment containing a power distribution therein with a barrier between that physically and electrically isolating the main breaker compartment from the power distribution compartment, thereby allowing the power distribution compartment to be completely free of live electrical components while maintenance is being performed.

The compartmentalized main breaker panelboard includes a grounded or nonconductive physical barrier separating the two compartments with each compartment having a separate dead front behind the panel door. The purpose of the barrier and separate dead fronts is to provide full protection and isolation from energized components in the main breaker compartment to effectively eliminate the hazard of accidental exposure to any energized components. The aforementioned feature functions to mitigate a major safety concern in the field and solves several issues as contractors, electricians, and end users no longer have to shut down upstream power sources that may expose them to a greater arc flash risk. The compartmentalized main breaker panelboard also allows residential customers to do electrical maintenance without the chance of being exposed to live electrical components.

With the present design, the main breaker, fused switch, or other overcurrent protection device in the first compartment is physically and electrically isolated from the power distribution bus of the second compartment. The first compartment will contain the incoming power feeders and the main circuit breaker mechanism, or other overcurrent protection device which feeds to the power distribution bus in the second compartment. The second compartment will contain the power distribution bus and may contain any number of breakers or breaker spaces, typically ranging from but not limited to 2 to 84 spaces and ranging from 10 amps-1200 amps, single pole, two poles, or three poles phasing. The distribution bus can be of any amperage, but typically being between but not limited to 30 amps to 1200 amps. This design can be applied to other applications besides panelboards, including load centers and other electrical distribution means.

Although the example of the present invention discussed below will be directed to the compartmentalized main breaker panelboard having two compartments, the first compartment housing the incoming power and main breaker or overcurrent protection device, the second compartment housing the power distribution bus and circuit breakers, alternative embodiments of the present invention are applicable, including in load centers.

This compartmentalized main breaker panelboard of the present invention will allow the end user to shut off power and have the power distribution bus 100% isolated from the incoming power feeds and main circuit breaker, eliminating the potential of accidental exposure, arc flash hazard, and eliminating the need to shut off upstream power sources, which may present an even greater arc flash hazard.

The compartments will be separated by a barrier that physically and electrically isolates the main breaker or other overcurrent protection device from the power distribution bus and breakers. The panel will have two dead front covers or other protective means: a dead front cover over the distribution bus and breaker compartment, and a separate dead front cover over the main circuit breaker or other overcurrent protection portion of the panel. The panelboard may have any number of doors, typically ranging from 1 to 4 doors. The physical barrier and separate dead front allow for maintenance work to be completed in the distribution portion of the panelboard without any potential accidental exposure to the incoming power feed. This eliminates both potential arc flash and electrocution hazards.

Referring to the drawings, FIG. 1 is a front view and FIG. 1A is a side view showing an embodiment of a compartmentalized panelboard 10 of the present invention that includes a first main breaker interior 11 and a second main breaker interior 12.

Located within the first main breaker interior 11 are incoming power conductors 13, which enter the first main breaker interior 11 and terminate at a main breaker 14 located within the first main breaker interior 11. Power is distributed to all branch feeder breakers required in the first main breaker interior 11 as well as to the second main breaker interior 12 via an isolating breaker 15 or some other switching device through conductors 16 or some other conducting means into second main breaker interior 12 and terminating to a main breaker 17 located within the second main breaker interior 12.

The above conductors 16 pass through a non-conductive or grounded barrier, and preferably is a non-conductive or grounded metallic barrier 18 separating and isolating interiors 11 and 12 from one another with conductors 16 passing through a properly sized grommet, opening, or sealing 19 so that no contact can be made to the adjacent interiors 11 and 12 should it be energized with a voltage.

FIG. 2 is a schematic view of an embodiment of a distribution system 20 of the present invention showing incoming conductors 21 terminating into the main breaker of a first power distribution bus 22.

Power is distributed from there throughout the power distribution bus 23 and branch breakers 23. Power is also fed through isolating breaker or switch 24, through conductors or other conducting means 25 to a main breaker 26 of a second power distribution bus 27. Power is distributed through the second isolated power distribution bus 27 to the required circuits. A dashed line shows panel enclosure 28 along with isolating barrier 29.

It should be understood that this is meant to encompass any combination of size and quantity of distribution or branch breakers and incoming power into either power distribution bus 23, 27 may also terminate via fusible switch or main lugs in place of main circuit breakers as shown in FIG. 2.

FIG. 3 is a front view and FIG. 3A is a side view showing an alternative embodiment of a compartmentalized panelboard 30 of the present invention that includes a first main lug interior 31, and a second main lug interior 32 with associate cabling. Incoming power conductors 33 enter the first main lug interior 31 and terminate at the main lugs 34 located in first main lug interior 31. Power is distributed to all branch feeder breakers required in first main lug interior 31 as well as to the second main lug interior 32 via isolating breaker or other switching device 35 through conductors or other conducting 36 into the second main lug interior 32 and terminating to the main lugs 37 located in the second main lug interior 32.

The conductors 36 pass through a non-conductive or grounded metallic barrier 38 separating and isolating interiors 31 and 32 from one another with conductors 36 passing through a properly sized grommet, opening, or sealing device 39 so that no contact can be made to the adjacent interior 31, 32 should it be energized with a voltage.

FIG. 4 is a front view and FIG. 4A is a side view showing an alternative embodiment of a compartmentalized panelboard 40 of the present invention that includes a first main breaker interior 41 and a second main lug interior 42 with associated cabling. Incoming power conductors 43 enter the first main breaker interior 41 and terminate at the main breaker 44 located in the first main breaker interior 41.

Power is distributed to all branch feeder breakers required the first main breaker interior 41 as well as the second main lug interior 42 via isolating breaker or other switching device 45 through conductors or other conducting means 46 into the second main lug interior 42 and terminating the main lugs 47 located in the second main lug interior 42.

The conductors 46 pass through a non-conductive or grounded metallic barrier 48 separating and isolating interiors 41, 42 from one another with the conductors 46 passing through a properly sized grommet, opening, or sealing device 49 so that no contact can be made to the adjacent interior 41, 42 should it be energized with a voltage.

FIG. 5 shows a front view of a compartmentalized panel 50 within an enclosure 51 having individual doors 52 and dead front installed 53. Each interior, not shown, includes its own separate door 52 so that the adjacent interior can be accessed while keeping the other interior completely isolated. Each interior will contain its own dead front 53 with a non-conductive or grounded metallic barrier 54 separating the two interiors.

FIG. 6 is a front view and FIG. 6A is a side view showing an embodiment of a compartmentalized panelboard 55 of the present invention without doors or dead fronts installed and with incoming conductors 56 terminating into a main breaker device 57. The incoming conductors 56 and the main breaker device 57 are contained in a main breaker compartment 58 isolated both physically and electrically from a branch distribution portion 59 of the panelboard 55.

The main breaker device 57 functions to feed power to the power distribution bus 59 via any type of electrically conductive material or conductor 60 such as but not limited to aluminum busing or copper cable. The conductors 60 pass through a non-conductive or grounded barrier 61 through a grommet or other type of sealing device such that the main breaker compartment 58 remains electrically and physically isolated from the branch distribution portion 59 with the aforementioned components are all housed in a single enclosure 62.

FIG. 7 is a front view and FIG. 7A is a side view showing an alternative embodiment of a compartmentalized panelboard 63 of the present invention having doors removed and a dead front panel 64 covering over a main breaker compartment 65 and a dead front cover 66 over a branch distribution compartment 67. Although access to a handle of various types of disconnecting devices such as for example a main breaker handle 68a of a main breaker 68 and a branch breaker handle 69a of a branch breaker 69 is still available through the dead front panels 64, and 66, the main breaker compartment 65 remains fully barriered and isolated.

The main breaker 68 is electrically connected to a power distribution bus 70 through any type of electrically conductive material or conductors 71 such as but not limited to aluminum busing or copper cable. The conductors 71 travel through a non-conductive or grounded barrier 72 via gourmet or other types of sealing device 72a which keeps full electrical and physical isolation of the main breaker compartment 65 with dead front panel 64 in place with the aforementioned components all housed in a single enclosure 73.

Figure 8:
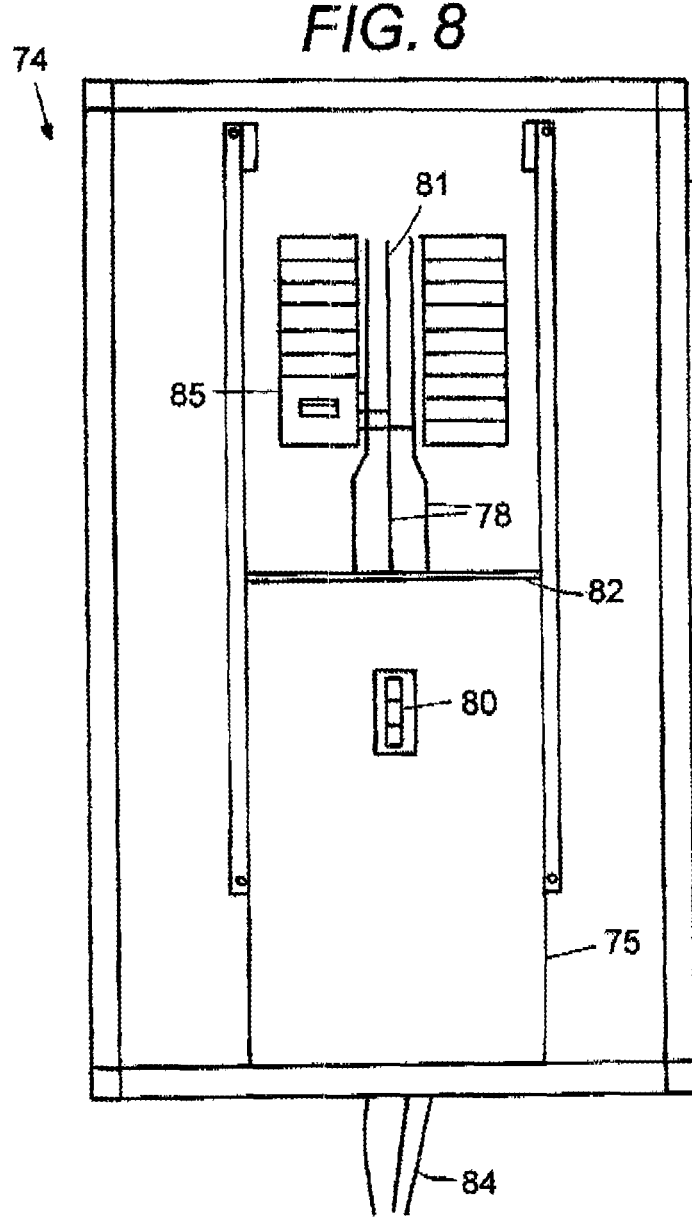
FIG. 8 is a front view of a further alternative embodiment of a compartmentalized panelboard assembly of the present invention referenced in FIG. 6 showing a dead front only on the main breaker compartment.
Figure 8A:
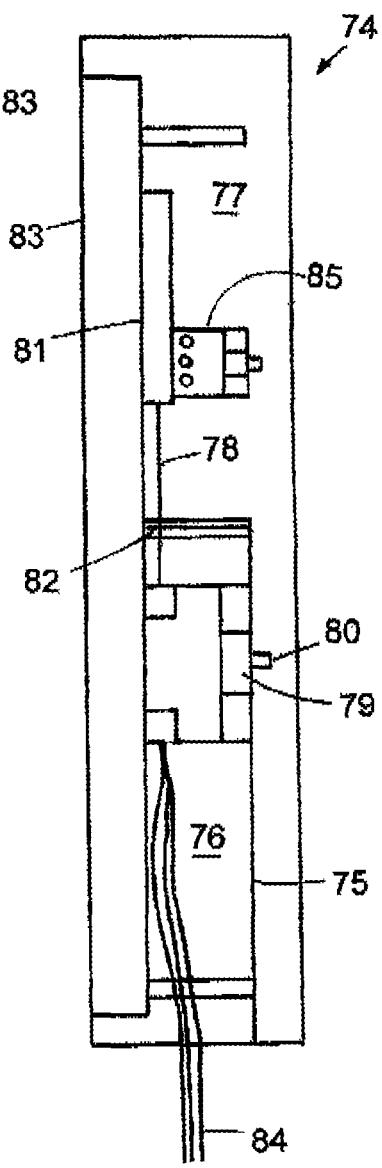
FIG. 8A is a side view of the compartmentalized panelboard assembly of FIG. 8.

FIG. 8 is a front view and FIG. 8A is a side view showing an alternative embodiment of a compartmentalized panelboard 74 of the present invention having the doors removed and a dead front panel 75 covering over a main incoming compartment 76 so that the main incoming compartment 76 remains electrically and physically isolated from a branch distribution compartment 77. FIG. 8 also shows the dead front panel removed from the branch distribution compartment 77 which reveals a bus or cabling or conductors 78 from a main breaker 79. Although access to a main breaker handle 80 or handle of other types of disconnecting devices is still available through the dead front panel 75, the main breaker compartment 76 remains fully barriered and isolated.

The main breaker device 79 is electrically connected to a power distribution 81 through any type of electrically conductive material or conductors 78 such as for example aluminum busing or copper cable. The conductors 78 travel through a non-conductive or grounded barrier 82 via a grommet or other types of sealing device which keeps full electrical and physical isolation of the main breaker compartment 76 with the dead front panel 75 in place with the aforementioned components all housed in a single enclosure 83.

Incoming conductors 84 enter into the isolated main breaker compartment 76 where the conductors 84 are isolated from the power distribution portion of the compartmentalized panelboard 74. The configuration of the compartmentalized panelboard 74, shown in FIGS. 8 and 8A, allow maintenance to the branch distribution section such as adding new branch breakers 85 and terminating at the branch breakers 85 with the main breaker device 79 open and locked out so that the upstream device is not required to be opened and the utility shut down or more widespread shutdown can be avoided.

We claim:

1. A physically and electrically isolating fully compartmentalized panelboard comprising: a first panel interior having an enclosing cover and a power distribution bus located therein; a second panel interior having an enclosing cover and a power distribution bus located therein; a conductive material connecting the power distribution bus of the first panel interior to the power distribution bus of the second panel interior; an isolating device allowing the contents of the first panel interior to stay energized while the contents of the second panel interior are de-energized by opening the isolating device; a non-conductive physical barrier separating the first panel interior from the second panel interior; and a sealing device located on the nonconductive physical barrier allowing the conductive material to pass from the first panel interior through the nonconductive physical barrier into the second panel interior, the non-conductive physical barrier and the enclosing covers cooperating to physically and electrically isolate the power distribution bus of the second panel interior from the power distribution bus of the first panel interior when power is cut off by the isolating device to allow the power distribution bus of the second panel interior to be completely free of live electrical components when maintenance work is being performed in the second panel interior to eliminate the hazard of accidental user exposure to any energized components while also avoiding the need to shut down all critical equipment of a building or upstream electrical equipment while performing electrical work, further reducing exposure to hazards.

2. The compartmentalized panelboard of claim 1 wherein the isolating device comprises a switching device that feeds power from the first first-panel interior to the second first-panel interior.

3. The compartmentalized panelboard of claim 1 wherein the isolating device comprises a circuit breaker.

4. The compartmentalized panelboard of claim 1 wherein incoming power into the first panel interior is fed either through a set of main lugs or a main circuit breaker.

5. The compartmentalized panelboard of claim 1 wherein the second panel interior includes a set of main lugs or main breaker, and incoming power is fed from an isolating device located in the first panel interior.

6. The compartmentalized panelboard of claim 1 wherein the first panel interior supports a first set of circuits supporting critical loads in a building and the second panel interior supports a second set of circuits supporting non-critical loads in the building.

7. The compartmentalized panelboard of claim 1 wherein the power distribution bus of the first panel interior and the second panel interior each includes different quantities and sizes of breakers.

8. The compartmentalized panelboard of claim 1 wherein the power distribution bus of the first panel interior and the second panel interior each range in amperage from 30 Amps to 1200 Amps.

9. The compartmentalized panelboard of claim 1 wherein sealing device located on the nonconductive physical barrier comprises a grommet.

10. A physically and electrically isolating fully compartmentalized panelboard comprising:
    a first panel interior having an incoming power and a main breaker mechanism located therein;
    a second panel interior having a power distribution bus located therein with the main breaker mechanism of the first panel interior electrically connected to the power distribution bus of the second panel interior and controlling the feed of power from the first panel interior to the second panel interior;
    a conductive material connecting the main breaker mechanism of the first panel interior to the power distribution bus of the second panel interior;
    at least one door enclosing the first panel interior and the second panel interior;
    a first dead front panel covering at least the main breaker mechanism of the first panel interior and a second dead front panel covering at least the power distribution bus of the second panel interior;
    a nonconductive physical barrier separating the first panel interior from the second panel interior; and
    a sealing device located on the nonconductive physical barrier allowing the conductive material to pass from the first panel interior through the nonconductive physical barrier into the second panel interior, the nonconductive physical barrier and the dead front panels physically and electrically isolating the power distribution bus of the second panel interior from the incoming power of the first panel interior when power is cut off by the main breaker mechanism to allow the power distribution bus of the second panel interior to be completely free of live electrical components when maintenance work is being performed in the second panel interior to eliminate potential accidental exposure to the incoming power feed.

11. The compartmentalized panelboard of claim 10 wherein said at least one door comprises a first door enclosing the first panel interior and a second door the second panel interior.

12. The compartmentalized panelboard of claim 10 wherein the sealing device comprises a grommet.

13. The compartmentalized panelboard of claim 10 wherein the first panel interior and the second panel interior comprise a single enclosure.

14. The compartmentalized panelboard of claim 10 wherein the non-conductive physical barrier comprises a grounded physical barrier.

15. The compartmentalized panelboard of claim 10 wherein the power distribution bus contains a plurality of circuit breakers.

16. A physically and electrically isolating fully compartmentalized panelboard comprising:
    a first panel interior having an incoming power and a main breaker mechanism located therein;
    a second panel interior having a power distribution bus located therein with the main breaker mechanism of the first panel interior electrically connected to the power distribution bus of the second panel interior and controlling the feed of power from the first panel interior to the second panel interior;
    a conductive material connecting the main breaker mechanism of the first panel interior to the power distribution bus of the second panel interior;

at least one door enclosing the first panel interior and the second panel interior;

a nonconductive physical barrier separating the first panel interior from the second panel interior; and a sealing device located on the nonconductive physical barrier allowing the conductive material to pass from the first panel interior through the nonconductive physical barrier into the second panel interior the nonconductive physical barrier and the dead front panels physically and electrically isolating the power distribution bus of the second panel interior from the incoming power of the first panel interior when power is cut off by the main breaker mechanism to allow the power distribution bus of the second panel interior to be completely free of live electrical components when maintenance work is being performed in the second panel interior to eliminate potential accidental exposure to the incoming power feed.

17. The compartmentalized panelboard of claim 16 including a first dead front panel covering at least the main breaker mechanism of the first panel interior and a second dead front panel covering at least the power distribution bus of the second panel interior.

18. The compartmentalized panelboard of claim 16 wherein the first panel interior includes a distribution bus located therein and an enclosing cover and the second panel interior includes an enclosing cover.

19. The compartmentalized panelboard of claim 16 wherein the first panel interior supports a first set of circuits supporting critical loads in a building and the second panel interior supports a second set of circuits supporting non-critical loads in the building.

\* \* \* \* \*